(12) United States Patent
Nam et al.

(10) Patent No.: US 11,059,584 B1
(45) Date of Patent: Jul. 13, 2021

(54) METHOD FOR DETECTING CHEMICAL POLLUTION CLOUD AND UNMANNED AERIAL VEHICLE FOR PERFORMING THE METHOD

(71) Applicant: AGENCY FOR DEFENSE DEVELOPMENT, Daejeon (KR)

(72) Inventors: Hyunwoo Nam, Daejeon (KR); Myungkyu Park, Daejeon (KR); Myeongjae Lee, Daejeon (KR); Sangwon Do, Daejeon (KR); Jinho Park, Daejeon (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 16/952,931

(22) Filed: Nov. 19, 2020

(30) Foreign Application Priority Data

Apr. 10, 2020 (KR) .......................... 10-2020-0044331

(51) Int. Cl.
*B64C 39/02* (2006.01)
*G05D 1/00* (2006.01)

(52) U.S. Cl.
CPC ...... *B64C 39/024* (2013.01); *B64C 2201/027* (2013.01); *B64C 2201/108* (2013.01); *B64C 2201/123* (2013.01); *B64C 2201/145* (2013.01)

(58) Field of Classification Search
CPC ............ B64C 39/024; B64C 2201/027; B64C 2201/108; B64C 2201/123; B64C 2201/145; G05D 1/00; G05D 1/0202; G05D 1/0044; B25J 9/16
See application file for complete search history.

(56) References Cited

U.S. PATENT DOCUMENTS

| 5,927,648 | A | * | 7/1999 | Woodland | ................ | B64D 7/00 244/118.1 |
| 6,096,267 | A | * | 8/2000 | Kishkovich | ......... | G03F 7/70525 422/52 |
| 7,761,954 | B2 | * | 7/2010 | Ziegler | ................ | A47L 11/302 15/320 |
| 9,629,220 | B2 | * | 4/2017 | Panopoulos | ........... | H05B 47/11 |
| 10,336,202 | B2 | * | 7/2019 | Panopoulos | ........... | H05B 47/12 |

(Continued)

FOREIGN PATENT DOCUMENTS

| KR | 10-2005-0050023 A | 5/2005 |
| KR | 10-2017-0012337 A | 2/2017 |
| KR | 10-2018-0119768 A | 11/2018 |

*Primary Examiner* — Yonel Beaulieu
(74) *Attorney, Agent, or Firm* — Knobbe Martens Olson & Bear LLP (57) ABSTRACT

This application relates to a method for detecting chemical pollution cloud which is performed by an unmanned aerial vehicle comprising. In one aspect, the method includes receiving, from a control device for controlling the unmanned aerial vehicle, a control signal and generating a status signal indicating a state of the unmanned aerial vehicle. The method also includes determining an operation mode for detecting the chemical pollution cloud based on the control signal and the status signal. The method further includes detecting the chemical pollution cloud based on a pre-learned autonomous algorithm without the control of the control device when the determined operation mode is an automatic detection mode for detecting the chemical pollution cloud without control of the control device.

18 Claims, 8 Drawing Sheets

(56) References Cited

U.S. PATENT DOCUMENTS

| | | | |
|---|---|---|---|
| 10,788,836 B2* | 9/2020 | Ebrahimi Afrouzi | ................. G05D 1/0212 |
| 10,816,939 B1* | 10/2020 | Coleman | ................... G01S 7/00 |
| 2011/0251800 A1* | 10/2011 | Wilkins | ................. G01N 21/33 702/24 |
| 2015/0035437 A1* | 2/2015 | Panopoulos | ............ F21V 14/02 315/112 |
| 2016/0161456 A1* | 6/2016 | Risk | ........................ G01P 13/02 702/24 |
| 2017/0166067 A1* | 6/2017 | Panopoulos | .............. B64F 1/00 |
| 2017/0292917 A1* | 10/2017 | O'Dell | .................... G01J 5/047 |
| 2018/0362157 A1* | 12/2018 | Teetzel | ................. B64C 39/024 |
| 2019/0101505 A1* | 4/2019 | Liu | ......................... G01N 33/24 |
| 2020/0132655 A1* | 4/2020 | Kusiek | ................... G01N 33/24 |
| 2020/0135036 A1* | 4/2020 | Campbell | ............ G08G 5/0026 |
| 2020/0225673 A1* | 7/2020 | Ebrahimi Afrouzi | ................. A47L 9/2857 |
| 2020/0409376 A1* | 12/2020 | Ebrahimi Afrouzi | ................. B25J 9/1676 |

* cited by examiner

METHOD FOR DETECTING CHEMICAL POLLUTION CLOUD AND UNMANNED AERIAL VEHICLE FOR PERFORMING THE METHOD

CROSS-REFERENCE TO RELATED APPLICATION

This application claims priority to Korean Patent Application No. 10-2020-0044331, filed on Apr. 10, 2020, the entire contents of which are incorporated herein by reference.

BACKGROUND

Technical Field

The present disclosure relates to a method for detecting chemical pollution clouds and an unmanned aerial vehicle for performing the method.

Description of Related Technology

Chemical, biological and radiological (CBR) reconnaissance is to find out a location of a pollutant source that generates a chemical pollution cloud by conducting reconnaissance in a region where pollution is expected and to find out a specific contour (such as pollutant boundary) of the pollutant region.

SUMMARY

In view of the above, the present disclosure provides a method for autonomously detecting and tracking chemical pollution clouds without user control, based on pollution concentration detected in real time, previously learned topographic information and climate information, and an unmanned aerial vehicle for performing the method.

In accordance with an aspect of the present disclosure, there is provided a method for detecting chemical pollution cloud which is performed by an unmanned aerial vehicle comprising: receiving, from a control device for controlling the unmanned aerial vehicle, a control signal; generating a status signal indicating a state of the unmanned aerial vehicle; determining an operation mode for detecting the chemical pollution cloud based on the control signal and the status signal; and detecting the chemical pollution cloud based on a pre-learned autonomous algorithm without the control of the control device when the determined operation mode is an automatic detection mode for detecting the chemical pollution cloud without control of the control device.

In accordance with another aspect of the present disclosure, there is provided an unmanned aerial vehicle for detecting chemical pollution cloud, comprising: a transceiver configured to receive a control signal from a control device for controlling the unmanned aerial vehicle; and a controller configured to control the transceiver, wherein the controller is further configured to: generate a status signal indicating a state of the unmanned aerial vehicle, determine an operation mode for detecting the chemical pollution cloud based on the control signal and the status signal, and when the determined operation mode is an automatic detection mode for detecting the chemical pollution cloud without control of the control device, detect the chemical pollution cloud based on a pre-learned autonomous algorithm without the control of the control device.

In accordance with still another aspect of the present disclosure, there is provided a system for detecting chemical pollution cloud, comprising: a control device configured to transmit a control signal for controlling movement and detection of an unmanned aerial vehicle to the unmanned aerial vehicle; and the unmanned aerial vehicle configured to determine an operation mode for detecting the chemical pollution cloud based on the control signal and a status signal indicating a state of the unmanned aerial vehicle, wherein when the determined operation mode is an automatic detection mode for detecting the chemical pollution cloud without control of the control device, the unmanned aerial vehicle is further configured to detect the chemical pollution cloud based on a pre-learned autonomous algorithm without the control of the control device.

According to an embodiment of the present disclosure, it is possible to more safely detect and track a chemical pollution cloud by introducing the unmanned aerial vehicle into a polluted area with a high concentration of chemical substances harmful to a human body.

Further, since the unmanned aerial vehicle detects a chemically polluted area without the user's control, it is possible to detect the polluted area even when there is no user capable of controlling the unmanned aerial vehicle or when communication between the unmanned aerial vehicle and the control device therefor is not available.

BRIEF DESCRIPTION OF THE DRAWINGS

The objects and features of the present disclosure will become apparent from the following description of embodiments, given in conjunction with the accompanying drawings.

DETAILED DESCRIPTION OF EMBODIMENTS

Pollutants discharge chemical substances harmful to a human body in the form of gases or liquids, and the discharged chemical substances may form chemical pollution clouds like clouds in the atmosphere. If the formed chemical pollution cloud moves or expands to other areas over time, the scale of damage caused by the chemical pollution cloud may also increase. Therefore, in order to minimize the damage caused by the chemical pollution cloud, it is necessary to quickly detect the diffusion area of the chemical pollution cloud and confirm the exact location and shape of the chemical pollution cloud early.

However, if a person directly explores an area of a chemical pollution cloud, there is a possibility that the person would be completely exposed to the chemical substances in the chemical pollution cloud, and in general, chemical substances in the chemical pollution cloud are harmful to a human body, which seriously affects the safety of the person.

In order to solve the above problem, a separate device for detecting the area of chemical pollution clouds can be used. If a user manually controls the device for detecting the chemical pollution cloud at a remote location from the chemical pollution cloud area, precise control of the user is required to detect the boundary and the source of the chemical pollution cloud. Further, there may be a problem that the accuracy of the detecting the boundary of the chemical pollution cloud varies depending on the user's skill level.

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
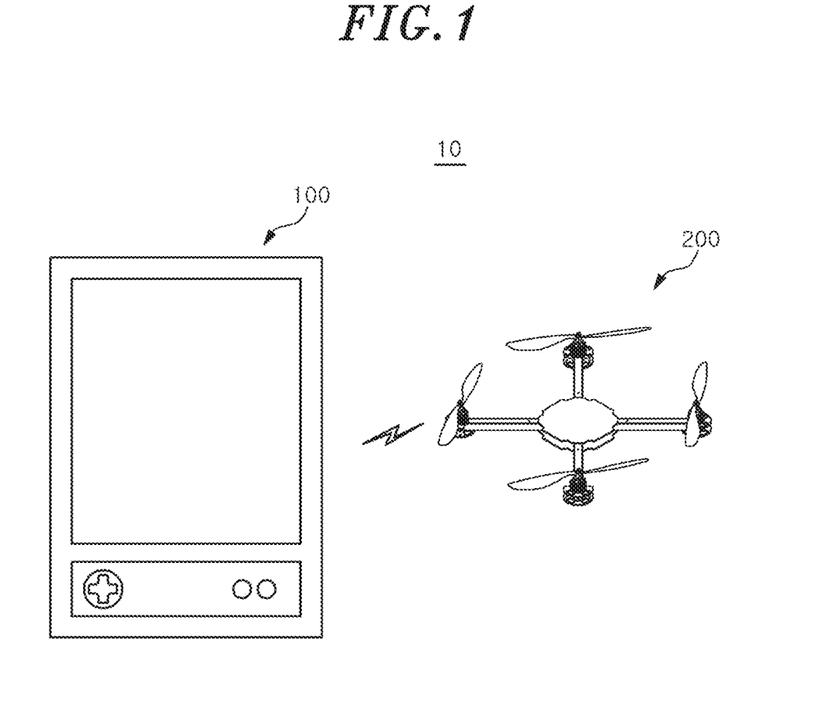
FIG. 1 shows a system for detecting a chemical pollutant area according to one embodiment of the present disclosure.

FIG. 1 is a block diagram showing a chemical pollution cloud detecting system according to one embodiment of the present disclosure.

Referring to FIG. 1, the chemical pollution cloud detecting system 10 includes a control device 100 and an unmanned aerial vehicle 200.

The control device 100 may refer to a device located at a remote location and capable of controlling the unmanned aerial vehicle 200. The control device 100 may control the unmanned aerial vehicle 200 under the control of a user or according to a preset control program.

The control device 100 may be any one of a laptop computer, a smart phone, a tablet, a wearable computer, and a server, but is not limited thereto. That is, the control device 100 may mean any type of electronic device capable of controlling the unmanned aerial vehicle 200.

The unmanned aerial vehicle 200 may refer to a device that does not have a person on board, but is automatically or manually controlled by a remote user. For example, the unmanned aerial vehicle 200 may be a flying vehicle such as a drone.

Figure 2:
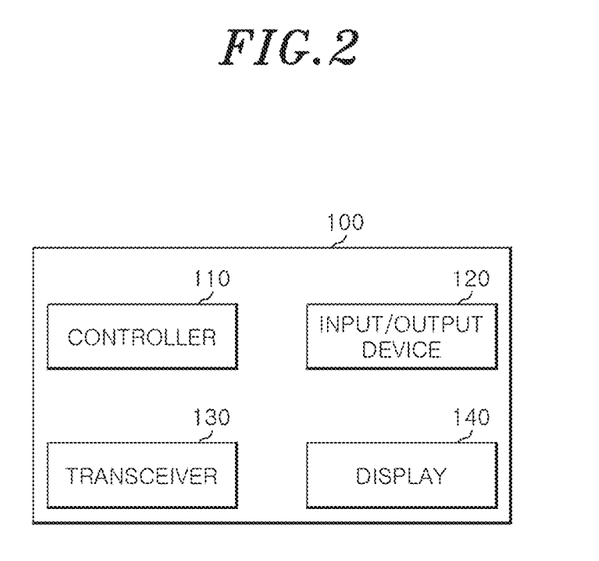
FIG. 2 is a functional block diagram of a control unit according to one embodiment of the present disclosure.

FIG. 2 is a functional block diagram showing a control unit according to one embodiment of the present disclosure.

Referring to FIGS. 1 and 2, the control device 100 includes a controller 110, an input/output device 120, a transceiver 130, and a display 140.

The controller 110 may generally control the operation of the control device 100.

The controller 110 may generate a control signal for controlling the flight and/or pollution cloud detection of the unmanned aerial vehicle 200, and transmit the generated control signal to the unmanned aerial vehicle 200.

The control signal may be input through a user's control command or may be automatically generated by an internal operation of the control device 100. Here, the term "pollution cloud" may mean a collection of chemical gases, such as air pollutant gas and toxic gas harmful to a human body, distributed (sprayed) in a specific area.

The controller 110 may generate a control signal corresponding to a control command input through the input/output device 120. For example, the controller 110 may generate an overall control signal for controlling the operation of the unmanned aerial vehicle 200 input through the input/output device 120 such as flight start/end signals corresponding to flight start/end commands, autonomous algorithm execution start/end signals of the unmanned aerial vehicle 200, and a straight flight signal corresponding to a straight flight command, a direction changing signal corresponding to a direction changing command, a descending signal corresponding to a descending command and a current position maintenance signal corresponding to a current position maintenance command, which can be directly controlled by a user.

The controller 110 may be implemented as an operation unit including a microprocessor. For example, the controller 110 may be implemented as a central processing unit (CPU) and the like. At this time, the controller 110 may be implemented as a single microprocessor or as a single system on chip (SOC) in which a plurality of microprocessors is integrated.

The input/output device 120 may be provided on the exterior of the control device 100 so that a user can input a control command through the input/output device 120. The input/output device 120 may be provided on the front surface of the control device 100 viewed from the user.

The input/output device 120 may be implemented to receive a control command from a user. For example, the input/output device 120 may include a push button for receiving a control command by sensing a user's pressure, a capacitive button for receiving a control command by sensing a user's touch, and the like. Besides, the input/output device 120 may be implemented in the form of a keyboard, a joystick, a trackball, a jog shuttle or the like to receive a control command from a user.

The transceiver 130 may communicate with the unmanned aerial vehicle 200 through various communication methods. For example, the transceiver 130 according to one embodiment can communicate with the unmanned aerial vehicle 200 via a base station through a known communication method such as CDMA, GSM, W-CDMA, TD-SCDMA, WiBro, LTE, EPC, or the like. On the contrary, the transceiver 130 according to another embodiment can communicate with the unmanned aerial vehicle 200 within a predetermined distance through a communication method such as wireless LAN, Wi-Fi, Bluetooth, Zigbee, Wi-Fi Direct (WFD), Ultra Wideband (UWB), Infrared Data Association (IrDA), Bluetooth Low Energy (BLE), Near Field Communication (NFC), or the like. The communication method between the transceiver 130 of the present disclosure and unmanned aerial vehicle 200 is not limited to the above-described embodiments.

The controller 110 may control the transceiver 130 to transmit and receive information directly or indirectly related to flight and/or detection of the unmanned aerial vehicle 200. For example, the controller 110 controls the transceiver 130 to transmit a control signal for controlling the flight operation and/or detecting operation of the unmanned aerial vehicle 200 to the unmanned aerial vehicle 200, or receive from the unmanned aerial vehicle 200 flight information and/or detection information obtained during the flight of the unmanned aerial vehicle 200.

The display 140 may display flight information and/or detection information of the unmanned aerial vehicle 200. For example, the display 140 may display a flight path and a flight speed of the unmanned aerial vehicle 200, map information around the unmanned aerial vehicle 200, and a detected gas concentration.

The display 140 may be implemented as a cathode ray tube (CRT), plasma display panel (PDP), liquid crystal display (LCD), light emitting diode (LED), or organic light emitting diode (OLED), but is not limited thereto. That is, the display 140 may be implemented as any output device capable of displaying flight information and/or detection information of the unmanned aerial vehicle 200.

Figure 3:
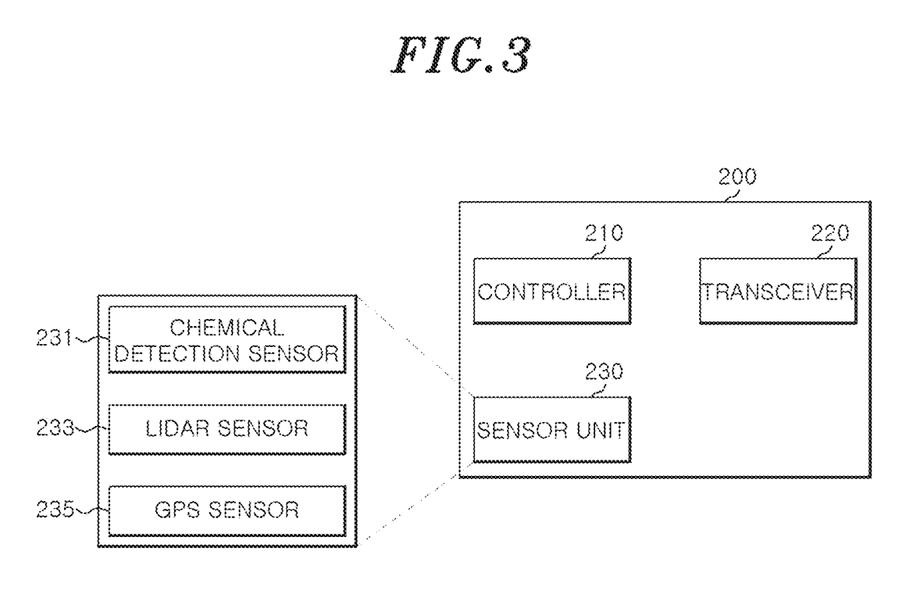
FIG. 3 is a functional block diagram of an unmanned aerial vehicle according to one embodiment of the present disclosure.

FIG. 3 is a block diagram showing an unmanned aerial vehicle according to one embodiment of the present disclosure.

FIGS. 1 and 3, the unmanned aerial vehicle 200 may include a controller 210, a transceiver 220, and a sensor unit 230.

The controller 210 may generally control the operation of the unmanned aerial vehicle 200.

The controller 210 may be implemented as an operation unit including a microprocessor. For example, the controller 210 may be implemented as a central processing unit (CPU) and the like. At this time, the controller 210 may be implemented as a single microprocessor or as a single system on chip (SOC) in which a plurality of microprocessors is integrated.

The controller 210 may control the transceiver 220 to transmit and receive information directly or indirectly related to flight and/or detection of the unmanned aerial vehicle 200 to and from the control device 100. The controller 210 may control the transceiver 220 to receive a control signal for controlling the operation of the unmanned aerial vehicle 200 from the control device 100, or transmit information obtained during the flight operation and/or the detection operation of the unmanned aerial vehicle 200 to the control device 100.

The transceiver 220 may be provided to communicate with the control device 100. To this end, the transceiver 220 may communicate with the control device 100 using the same communication method as the control device 100.

The sensor unit 230 may include a chemical detection sensor 231, a LiDAR (light detection and ranging) sensor 233, and a GPS sensor 235.

The chemical detection sensor 231 can detect the presence of chemical substances defined as pollutants and the concentration of the chemical substances. The chemical detection sensor 231 is provided at a position of the unmanned aerial vehicle 200 to easily detect the chemical substances in the atmosphere around the unmanned aerial vehicle 200 in flight.

The chemical detection sensor 231 according to one embodiment may be implemented as a contact-type sensor. The chemical detection sensor 231 may include a catalyst that is brought into contact with and reacts with chemical substances. For example, the catalyst of the chemical detection sensor 231 according to one embodiment burns in contact with the chemical substances, thereby increasing a temperature in the sensor. Accordingly, the chemical detection sensor 231 can detect the presence and the concentration of the chemical substance based on the changes in a resistance of an internal element due to the temperature increase. However, this is merely one embodiment of the chemical detection sensor 231, and the chemical detection sensor 231 of the present disclosure can be variously implemented within a technical idea in which the chemical detection sensor 231 detects the chemical substances.

The LiDAR sensor 233 can detect altitude information of the unmanned aerial vehicle 200. The LiDAR sensor 233 may output the current altitude of the unmanned aerial vehicle 200 in a unit (e.g., meter) in real time whenever the unmanned aerial vehicle 200 becomes relatively far away from or closer to the ground.

The GPS sensor 235 may include a GPS antenna for receiving a satellite signal including coordinate information of the GPS sensor (the unmanned aerial vehicle 200 equipped with the GPS sensor 235) from a GPS satellite. The location information of the unmanned aerial vehicle 200 may include altitude information detected by the LiDAR sensor 233 and coordinate information detected by the GPS sensor 235.

Figure 4:
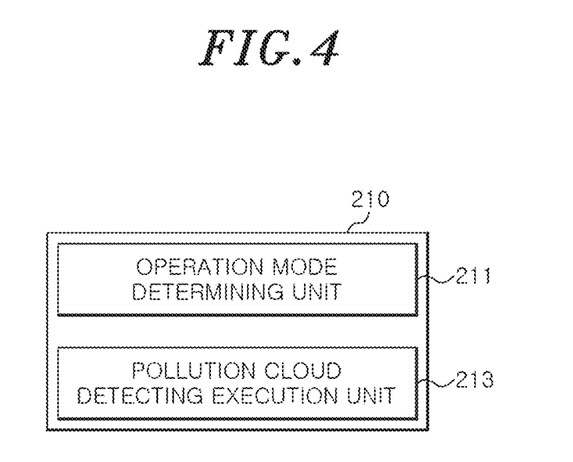
FIG. 4 is a block diagram conceptually showing a chemical pollution cloud detecting function of the unmanned aerial vehicle according to one embodiment of the present disclosure.

FIG. 4 is a block diagram conceptually showing a chemical pollution cloud detecting function of the unmanned aerial vehicle according to one embodiment of the present disclosure.

Referring to FIGS. 3 and 4, the controller 210 of the unmanned aerial vehicle 200 may include an operation mode determining unit 211 and a pollution cloud detecting execution unit 213.

The operation mode determination unit 211 and the pollution cloud detecting execution unit 213 illustrated in FIG. 4 are conceptually divided functions of the controller 210 in order to easily describe the functions of the controller 210, and the present disclosure is not limited thereto. According to embodiments, functions of the operation mode determination unit 211 and the pollution cloud detecting execution unit 213 may be merged/separated, and the operation mode determination unit 211 and the pollution cloud detecting execution unit 213 may be implemented as a series of commands included in one or more programs.

The operation mode determination unit 211 may determine, based on the control signal received from the control device 100 and the status signal generated by the unmanned aerial vehicle 200 whether to perform the pollution cloud detecting operation of the unmanned aerial vehicle 200 automatically by an autonomous algorithm (i.e., to operate in an automatic pollution cloud detection mode) or manually under the control of the control device 100 (i.e., to operate in a manual pollution cloud detection mode).

The control signal of the control device 100, which is used in the operation mode determination unit 211 to determine the operation mode of the pollution cloud detecting operation, is an autonomous algorithm execution start signal indicating to start the automatic pollution cloud detection mode and an autonomous algorithm execution end signal indicating to terminate the automatic pollution cloud detection mode.

In addition, the status signal used in the operation mode determination unit 211 to determine the operation mode of the pollution cloud detecting operation may be a signal indicating a communication state of the transceiver 220 of the unmanned aerial vehicle 200. That is, the status signal may indicate whether the transceiver 220 of the unmanned aerial vehicle 200 is in communication with the control device 100 or in a state in which it can communicate with the control device 100.

When the control signal received from the control device 100 indicates the autonomous algorithm execution start signal, or the status signal generated by the unmanned aerial vehicle 200 indicates that communication between the transceiver 220 and the control device 100 is not available, the operation mode determination unit 211 may decide to automatically perform the pollution cloud detecting operation by the autonomous algorithm.

On the other hand, when the status signal generated by the unmanned aerial vehicle 200 indicates that communication between the transceiver 220 and the control device 100 is available, and the control signal received from the control device 100 does not indicate a start signal for performing the autonomous algorithm, the operation mode determination unit 211 may determine to manually perform the pollution cloud detecting operation under the control of the control device 100.

When the operation mode determination unit 211 determines to manually perform the pollution cloud detecting operation, the pollution cloud detecting execution unit 213 allows the unmanned aerial vehicle 200 to move and/or detect pollution clouds based on the control signal of the control device 100. The pollution cloud detecting execution unit 213 may detect a pollution area during the movement and detection of the unmanned aerial vehicle 200 under the control of the control device 100 and measure a concentration of a chemical gas as a detection result.

According to one embodiment, the pollution cloud detecting execution unit 213 may transmit information on the measured concentration or processing information depending on the measured concentration to the control device 100 together with location information. The processing information is determined according to whether the measured concentration exceeds a preset reference concentration, and may be information indicating whether the measured location is within a pollution area or a pollution source.

Accordingly, the control device 100 may generate a chemical pollution cloud map for a region in which the pollution cloud is detected, based on the information on the concentration or processing information received from the pollution cloud detecting execution unit 213. The chemical pollution cloud map may include at least one of information on a boundary of the pollution cloud, a concentration for each location (region) of the chemical gas, and a location of the pollution source.

On the other hand, when the operation mode determination unit 211 decides to automatically perform the pollution cloud detecting operation, the pollution cloud detecting execution unit 213 allows the unmanned aerial vehicle 200 to automatically move and/or perform pollution cloud detecting operations by using a previously learned autonomous algorithm without the control of the control device 100. The pollution cloud detecting execution unit 213 may detect a pollution area while performing movement and detection of the unmanned aerial vehicle 200 based on an autonomous algorithm, and measure a concentration of a chemical gas as a detection result.

According to one embodiment, the pollution cloud detecting execution unit 213 may transmit information on the measured concentration or processing information depending on the measured concentration to the control device 100 together with location information. The processing information is determined according to whether the measured concentration exceeds a preset reference concentration, and may be information indicating whether the measured location is within a pollution area or a pollution source.

Accordingly, the control device 100 may generate a chemical pollution cloud map for a region in which the pollution cloud is detected, based on the information on the concentration or processing information received from the pollution cloud detecting execution unit 213. The chemical pollution cloud map may include at least one of information on a boundary of the pollution cloud, a concentration of the chemical gas for each location (region), and a location of the pollution source.

On the other hand, when communication between the transceiver 220 and the control device 100 is available and the pollution cloud detecting execution unit 213 operates in the automatic pollution cloud detection mode, the pollution cloud detecting execution unit 213 may store information on the measured concentration or processing information depending on the measured concentration together with location information. Thereafter, when communication between the transceiver 220 and the control device 100 becomes available, the pollution cloud detecting execution unit 213 uses the transceiver 220 to perform pre-stored location information and information on the measured concentration (or processing information depending on the measured concentration) to the control device 100.

Meanwhile, when the operation mode determination unit 211 instructs the pollution cloud detecting execution unit 213 to manually perform the pollution cloud detecting operation while the pollution cloud detecting execution unit 213 operates in the automatic pollution cloud detection mode, the pollution cloud detecting execution unit 213 may stop the detecting operation by the autonomous algorithm and perform the movement and/or the pollution cloud detecting operation based on the control signal of the control device 100.

When the operation time (e.g., continuous operation time) of the unmanned aerial vehicle 200 exceeds a preset operation time of the automatic pollution cloud detection mode (i.e., when it is determined that the pollution cloud detecting operation has been sufficiently conducted), or when the remaining amount of the battery of the unmanned aerial vehicle 200 is less than a preset value, the pollution cloud detecting execution unit 213 may stop the automatic pollution cloud detecting operation. In this case, according to one embodiment, the pollution cloud detecting execution unit 210 may stop the automatic pollution cloud detecting operation, and the unmanned aerial vehicle 200 may return to the initial take-off position (or a position preset by the user). Here, the initial take-off position may mean location information at the time when the unmanned aerial vehicle 200 took off (that is, when the unmanned aerial vehicle 200 started flying) in order to detect a pollution cloud, or location information when the unmanned aerial vehicle 200 received an initial location and an initial direction from the control device 100.

Figure 5:
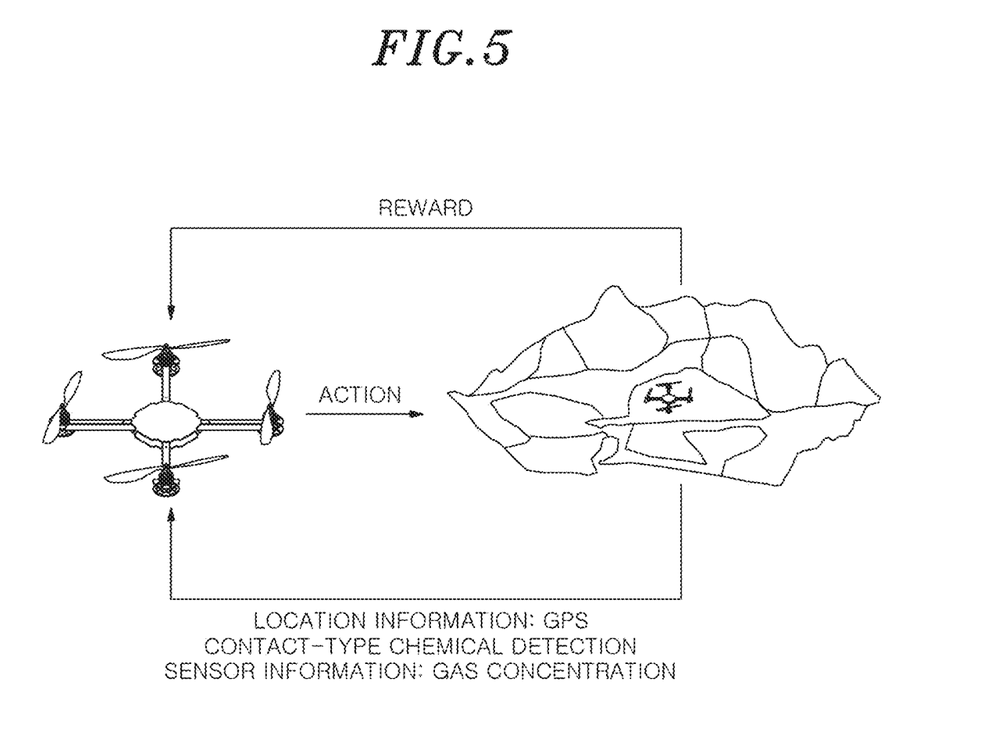
FIG. 5 is a diagram for explaining a method of learning an autonomous algorithm for performing an automatic pollution cloud detection mode according to one embodiment of the present disclosure.

FIG. 5 is a diagram for explaining a method of learning an autonomous algorithm for performing the automatic pollution cloud detection mode according to one embodiment of the present disclosure.

Referring to FIG. 5, the autonomous algorithm of the unmanned aerial vehicle 200 may be learned based on reinforcement learning.

According to one embodiment, the reinforcement learning may assume a given subject as a Markov Decision Process (MDP) subject. For example, the unmanned aerial vehicle 200 acquires location information and detection information using sensors included in the sensor unit 230 in a chemically polluted area, and when performing a specific action based on the acquired location information and detection information and previously learned results, reinforcement learning may be performed in a manner in which a reward depending on the specific action is given.

Here, the reward may mean a weight depending on the concentration of the chemical pollution cloud detected by the unmanned aerial vehicle 200 when moving along a flight path according to a specific action performed by the unmanned aerial vehicle 200. For example, as the unmanned aerial vehicle 200 detects a chemical pollution cloud or moves to an area where a higher concentration of chemical pollution cloud is measured, a higher reward may be provided.

The unmanned aerial vehicle 200 learns a policy for maximizing reward during a series of repeating operations of moving, measuring concentration of chemical pollution clouds, and setting the next flight path, thereby tracking chemical pollutants.

According to one embodiment, a policy for a reward granted to learn the autonomous algorithm may be as shown in Table 1 below.

TABLE 1

| Result of Action | Reward | Contents |
| --- | --- | --- |
| $p_a(t) > p_a(t-1)$ | 1 | When the unmanned aerial vehicle moves in a direction where the concentration of pollution increases |
| $p_a(t) < p_a(t-1)$ | −1 | When the unmanned aerial vehicle moves in a direction where the concentration of pollution decreases |
| $p_a(t) = p_a(t-1)$ | −0.1 | When the unmanned aerial vehicle moves in a direction where the concentration of pollution is kept unchanged |
| $p_a(t) \geq p_a(t-1)$ | 2 | When the unmanned aerial vehicle detects the highest concentration of pollution |

That is, if the pollution concentration $\rho_a(t)$ measured by the unmanned aerial vehicle 200 moving along the next flight path is higher than the pollution concentration before the movement $\rho_a(t-1)$, the action "a" of the autonomous algorithm is given the reward of +1.

On the other hand, if the pollution concentration $\rho_a(t)$ measured by the unmanned aerial vehicle 200 moving along the next flight path is lower than the pollution concentration before the movement $\rho_a(t-1)$, the action "a" of the autonomous algorithm is given the reward of −1. And, if the pollution concentration $\rho_a(t)$ measured by the unmanned aerial vehicle 200 moving along the next flight path is the same as the pollution concentration before the movement $\rho_a(t-1)$, the action "a" of the autonomous algorithm is given the reward of −0.1.

In addition, if the pollution concentration $\rho_a(t)$ measured by the unmanned aerial vehicle 200 moving along the next flight path corresponds to the highest pollution concentration (that is, the pollution concentration $\rho_a(t)$ corresponds to a preset value as the highest pollution concentration), the action "a" of the autonomous algorithm is given the reward of +2.

In the reinforcement learning, the expected value of the reward to be given to the unmanned aerial vehicle 200 when the unmanned aerial vehicle 200 follows an action policy u in an arbitrary state $s_t$ may be defined as a state value function $V_\pi(s_t)$. Further, the expected value of the reward to be given to the unmanned aerial vehicle 200 when the unmanned aerial vehicle 200 takes an action $a_t$ according to the action policy $\pi$ in an arbitrary state $s_t$ may be defined as a state-action value function $Q_\pi(s_t, a_t)$.

The reinforcement learning is performed by learning the autonomous algorithm in the direction of maximizing the state value function $V_\pi(s_t)$ for each state $s_t$ or the state-action value function $Q_\pi(s_t, a_t)$ for a state-action pair to find an optimal action policy $\pi^*(s_t)$ that maximizes the reward. This can be expressed by the following Equation 1.

$$V_\pi(s_t) = E\left[\sum_{k=1}^{\infty} \gamma^{k-1} r_{t+k} \,\bigg|\, s_t\right] = E[r_{t+1} + \gamma V_\pi(s_{t+1}) \,|\, s_t] \quad \text{[Equation 1]}$$

$$Q_\pi(s_t, a_t) =$$

$$E\left[\sum_{k=1}^{\infty} \gamma^{k-1} r_{t+k} \,\bigg|\, s_t, a_t\right] = E[r_{t+1} + \gamma Q_\pi(s_{t+1}, a_{t+1}) \,|\, s_t, a_t]$$

In this case, an optimal state value function $V^*(s_t)$ and an optimal state-action value function $Q^*(s_t, a_t)$ may be expressed by the following Equation 2.

$$V^*(s_t) = \max_\pi V_\pi(s_t) \quad \text{[Equation 2]}$$

$$Q^*(s_t, a_t) = \max_\pi Q_\pi(s_t, a_t)$$

According to the Bellman Optimality Equation, the optimal state value function $V^*(s_t)$ and the optimal state-action value function $Q^*(s_t, a_t)$ can be expressed as the following Equation 3.

$$V^*(s_t) = \max_\pi V_\pi(s_t) = \max_{a_t} Q_\pi(s_t, a_t) \quad \text{[Equation 3]}$$

$$= \max_{a_t} r_t + \gamma \sum_{s_{t+1} \in S} p(s_{t+1} \,|\, s_t) V^*(s_{t+1})$$

$$Q^*(s_t, a_t) = \max_\pi Q_\pi(s_t, a_t)$$

$$= r_t + \gamma \sum_{s_{t+1} \in S} p(s_{t+1} \,|\, s_t) V^*(s_{t+1})$$

In other words, the autonomous algorithm learns the state-action value function $Q_\pi(s_t, a_t)$ for all states in a given environment, thereby finding the optimal action policy $\pi^*(s_t)$ to achieve the purpose of tracking/detecting chemical pollution clouds.

However, when the number of states in the environment is numerous, there is a problem that it is difficult to define and learn the state-action value function $Q=(s_t, a_t)$ for all actions (A) in all states (S). To solve this problem, a deep neural network that can approximate the state-action value function $Q_\pi(s_t, a_t)$ for all states (S) and all actions (A) using DQN (Deep Q-Network) can be applied to the autonomous algorithm to learn the autonomous algorithm.

Figure 6A:
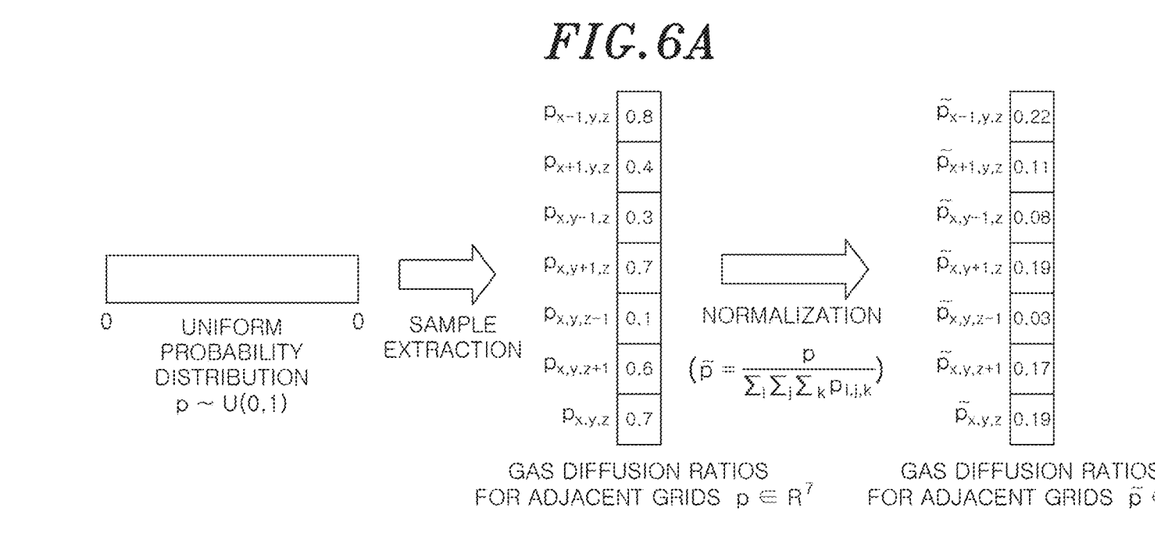
FIGS. 6A and 6B are views for explaining a simulated gas diffusion model used to learn the autonomous algorithm according to one embodiment of the present disclosure.
Figure 6B:
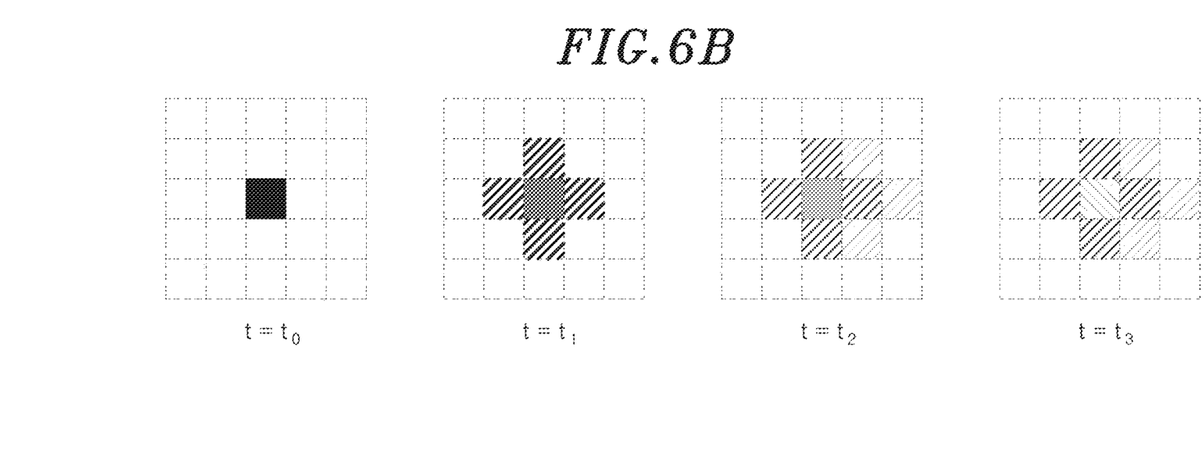

FIGS. 6A and 6B are views for explaining a simulated gas diffusion model used to learn an autonomous algorithm according to one embodiment of the present invention.

In order to learn the autonomous algorithm based on reinforcement learning, it is necessary to input topographic information on a topography in which the unmanned aerial vehicle 200 is to operate and gas diffusion information in the topography.

In particular, the gas diffusion information may correspond to key information in setting a flight path for maximizing the reward given when the unmanned aerial vehicle 200 moves.

As gas diffusion information used in the autonomous algorithm, measurement information measured by directly injecting a chemical gas onto the topography where the unmanned aerial vehicle 200 is to operate can be used. However, due to difficulty in controlling wind direction and wind speed, difficulty in measuring gas concentration and the like, it is difficult to obtain a sufficient amount of actual measurement information for learning. Therefore, in the autonomous algorithm learning method according to the present disclosure, the learning of the unmanned aerial vehicle 200 is performed using simulated gas diffusion information.

The topographic information on the topography where the unmanned aerial vehicle 200 is to operate is reconstructed into grid information obtained by dividing the topography into a plurality of grids, and the concentration of pollution cloud may be measured for each grid.

Assuming that the spread of the pollution cloud follows a certain normal distribution, it is possible to calculate the ratio of the pollution cloud spread over time from the current grid where the pollution cloud exists into six adjacent grids (upper grid, lower grid, right-handed grid, left-handed grid, forward grid, and backward grid) and the ratio of the pollution cloud remaining in the current grid.

The method of calculating the pollution cloud diffusion rate (i.e., the ratio of the pollution cloud that spreads to the adjacent grids after a reference time and the ratio of the pollution cloud that remains in the current grid) may include a distance-based ratio allocation method and a probability ratio allocation method.

In the distance-based ratio allocation method, ratios according to the distances from the source of the pollution cloud are calculated, and a lower concentration is assigned as the position of the grid is further away from the source of the pollution cloud.

In addition, in the probabilistic ratio allocation method, seven samples extracted from a uniform distribution between 0 and 1 for each number of cases (the current grid, the upper grid, the lower grid, the right-handed grid, the left-handed grid, the forward grid, and the backward grid) are normalized and the ratios thereof are calculated.

FIG. 6A shows an example of extracting seven samples and normalizing each sample, and FIG. 6B shows an example of a result of a simulated gas concentration diffusion performed using the probability ratio allocation method.

Figure 7:
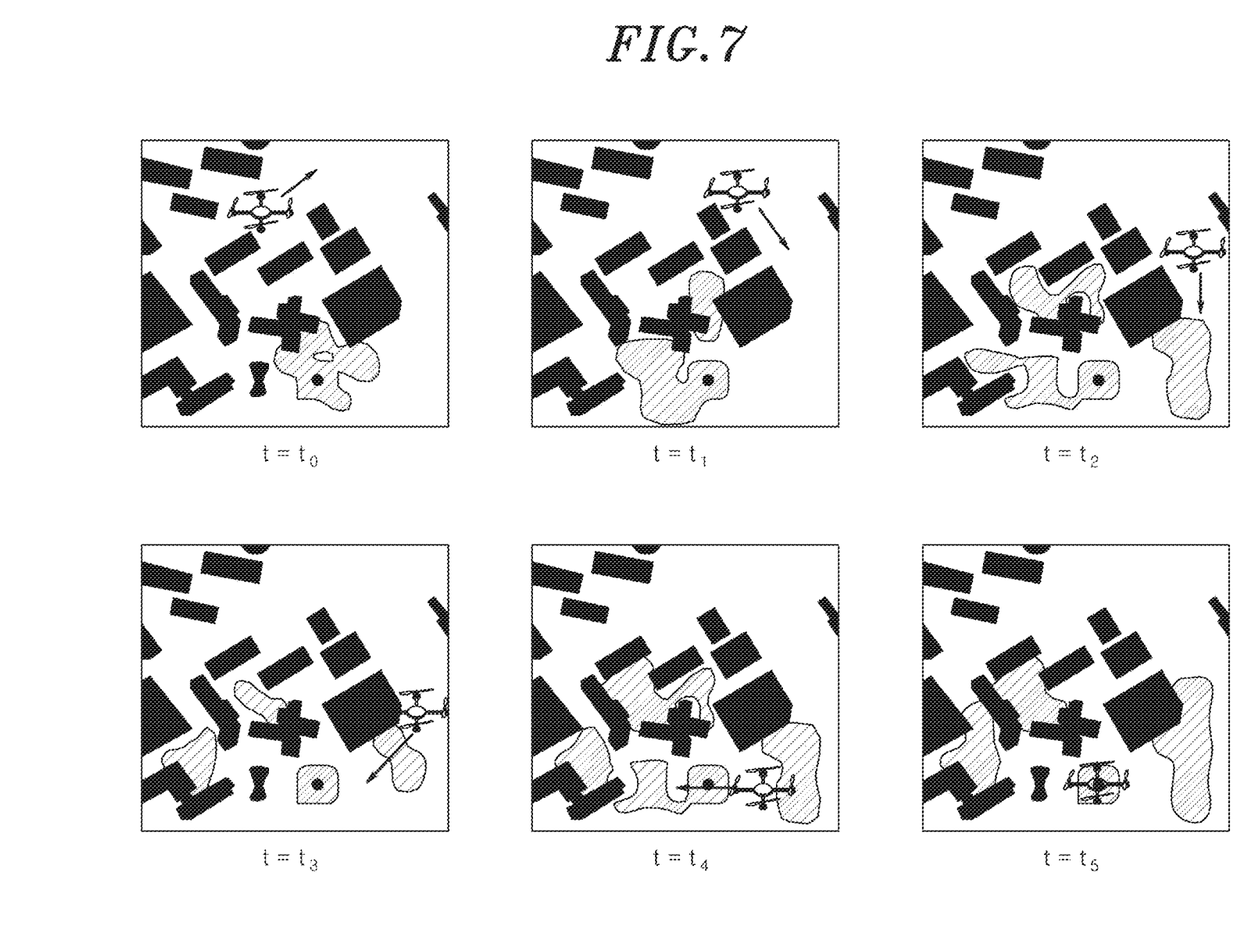
FIG. 7 shows a result of a simulation of a process of automatically detecting a chemical pollution cloud using the autonomous algorithm according to one embodiment of the present disclosure.

FIG. 7 shows a result of a simulation of a process of automatically detecting a chemical pollution cloud using the autonomous algorithm according to one embodiment of the present disclosure.

Referring to FIG. 7, when the unmanned aerial vehicle 200 is set to automatically track the pollution source of the pollution cloud at the initial time t0, the unmanned aerial vehicle 200 can then detect the pollution cloud for a time period of $t_1$ to $t_5$ by a previously learned autonomous algorithm.

During the detecting process, the unmanned aerial vehicle 200 explores the inside of the pollution cloud based on a preset criterion as a criterion for detecting a pollutant source. Then, when the unmanned aerial vehicle 200 finds a location where the detected result satisfies the preset criterion at a specific time point $t_5$, the unmanned aerial vehicle 200 may determine the location as the pollutant source.

For example, in the above pollution cloud tracking/detecting process, when the topography where the unmanned aerial vehicle 200 performs the operation includes a building or mountain with a high altitude, the unmanned aerial vehicle 200 may recognize the building or mountain as an obstacle depending on its flight capability. That is, the unmanned aerial vehicle 200 can automatically detect/track a chemical pollution cloud by autonomously selecting an available flight area depending on a preset flight capability thereof.

Figure 8A:
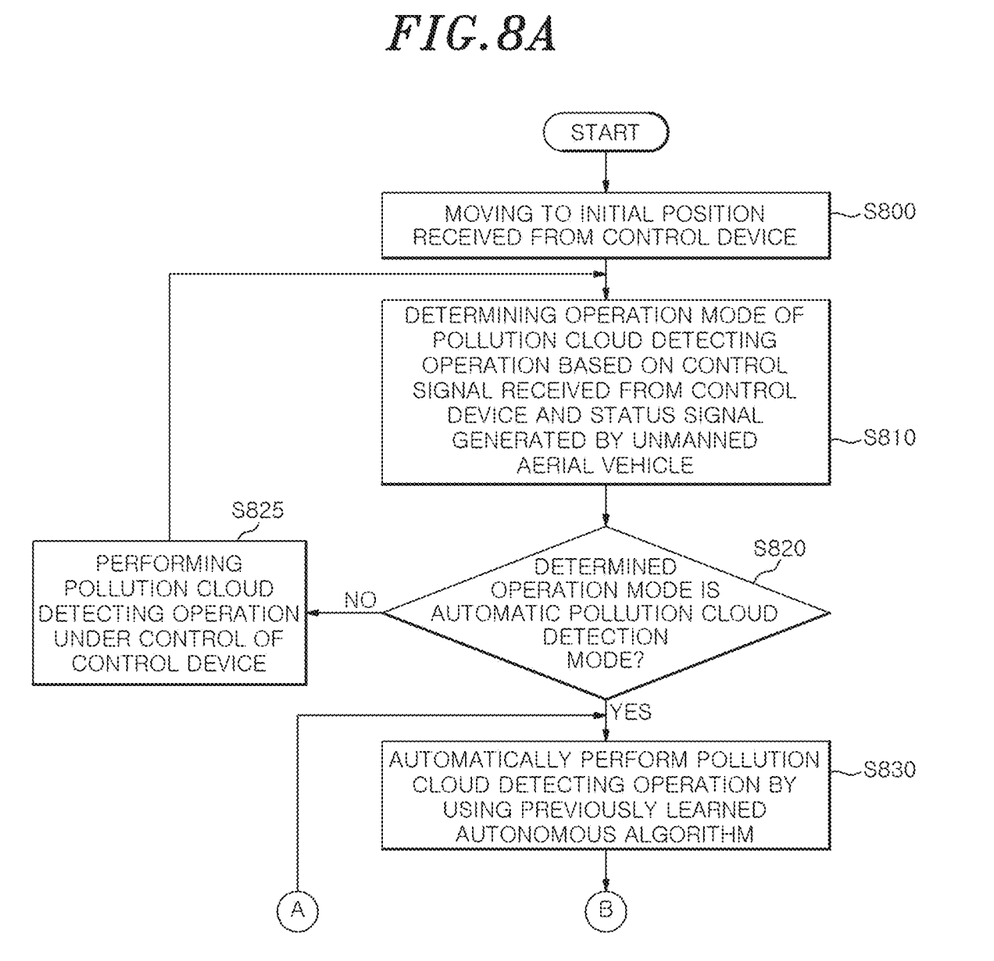
FIGS. 8A and 8B are flowcharts illustrating a method of automatically detecting a chemical pollution cloud by the unmanned aerial vehicle according to one embodiment of the present disclosure.
Figure 8B:
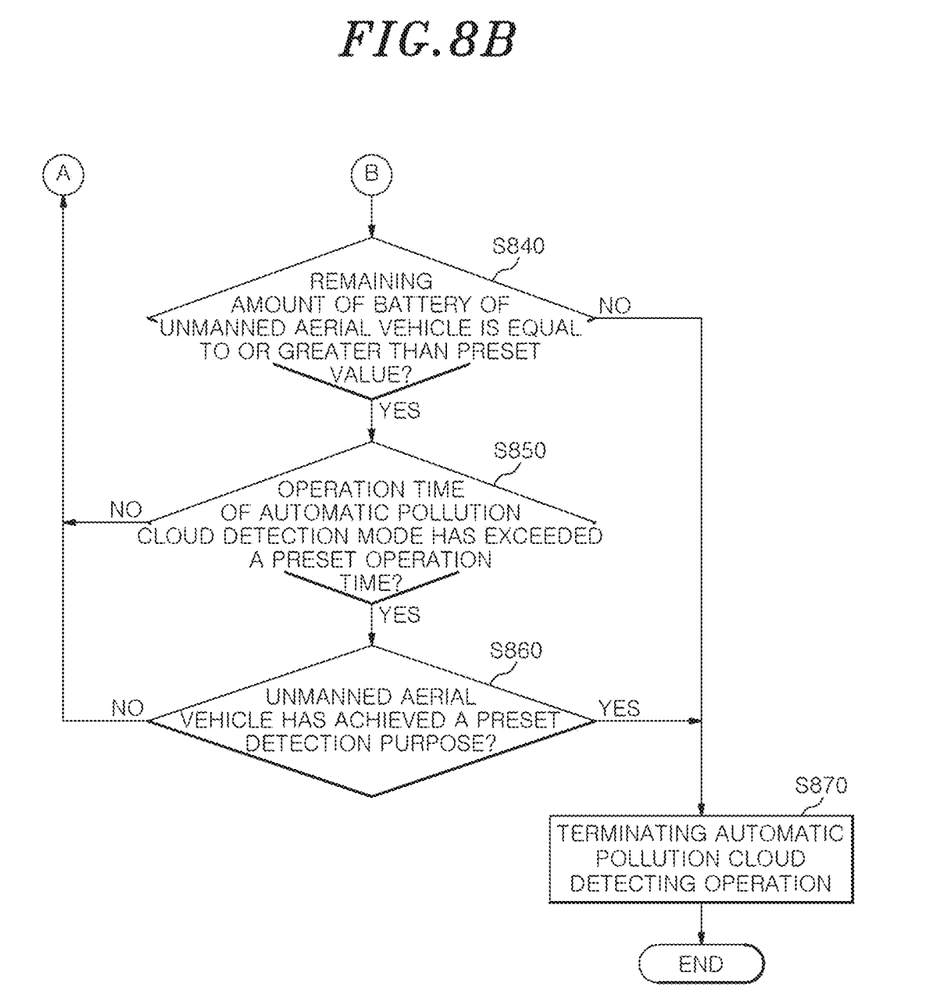

FIGS. 8A and 8B are flowcharts illustrating a method of automatically detecting a chemical pollution cloud by the unmanned aerial vehicle according to one embodiment of the present disclosure.

Referring to FIGS. 8A and 8B, when receiving an initial position and an initial movement direction from the control device 100 the unmanned aerial vehicle 200 may move to the initial position located in the initial movement direction in order to detect a pollution cloud (S800).

Thereafter, based on the control signal received from the control device 100 and the status signal generated by the unmanned aerial vehicle 200, the operation mode determining unit 211 may determine an operation mode of the pollution cloud detecting operation (S810).

When the determined operation mode is the manual pollution cloud detection mode ('No' in S820), the pollution cloud detecting execution unit 213 may perform a pollution cloud detecting operation under the control of the control device 100 (S825).

On the other hand, when the determined operation mode is the automatic pollution cloud detection mode ('Yes' in S820), the pollution cloud detecting execution unit 213 may automatically perform the pollution cloud detecting operation without the control of the control device 100 using a previously learned autonomous algorithm (S830).

Thereafter, as the unmanned aerial vehicle 200 performs the pollution cloud detecting operation, when the remaining amount of the battery of the unmanned aerial vehicle 200 is less than a preset value ('No' in S840), the pollution cloud detecting execution unit 213 terminates the automatic pollution cloud detecting operation (S870). In this case, the unmanned aerial vehicle 200 may move to an initial take-off position (or a position preset by a user).

On the other hand, when the remaining amount of the battery of the unmanned aerial vehicle 200 is equal to or greater than the preset value ('Yes' in S840), it is determined whether the operation time of the automatic pollution cloud detection mode has exceeded a preset operation time (S850) and whether the unmanned aerial vehicle 200 has achieved a preset detection purpose (S860). In steps S850 and S860, if the operation time of the automatic pollution cloud detection mode has exceeded a preset operation time ('Yes' in S850) and it is determined that the unmanned aerial vehicle 200 has achieved a preset detection purpose ('Yes' in S860), the pollution cloud detecting execution unit 213 may stop the automatic pollution cloud detecting operation (S870), In this case, the unmanned aerial vehicle 200 may move to the initial take-off position (or the position preset by the user).

On the other hand, if the operation time of the automatic pollution cloud detection mode has not exceeded the preset operation time ('Yes' in S850) or if it is determined that the unmanned aerial vehicle 200 has not achieved the preset detection purpose ('NO' in S860) although the operation time of the preset automatic pollution cloud detection mode has exceeded the preset operation time ('YES' in S850), the pollution cloud detecting execution unit 213 may continue to perform the automatic pollution cloud detecting operation.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method for detecting chemical pollution cloud which is performed by an unmanned aerial vehicle, the method comprising:
   receiving, from a control device for controlling the unmanned aerial vehicle, a control signal;
   generating a status signal indicating a probability of communication between the unmanned aerial vehicle with the control device;
   determining a pre-learned algorithm mode for detecting the chemical pollution cloud based on the control signal and the status signal; and
   when the status signal indicates the probability of communication with the control device is lower than a pre-determined threshold, or when the control signal indicates to operate in the pre-learned algorithm mode, detecting the chemical pollution cloud based on a pre-learned algorithm stored in the unmanned aerial vehicle.

2. The method of claim 1, further comprising:
   determining whether to terminate the pre-learned algorithm mode based on an operation time of the unmanned aerial vehicle operating in the pre-learned algorithm mode and a remaining amount of a battery of the unmanned aerial vehicle.

3. The method of claim 2, wherein, when the remaining amount of the battery of the unmanned aerial vehicle is less than a preset reference value, the detection of the chemical pollution cloud is terminated.

4. The method of claim 2, wherein whether to terminate the pre-learned algorithm mode is determined further based on whether a preset detection purpose is achieved.

5. The method of claim 4, wherein, when the remaining amount of the battery of the unmanned aerial vehicle is equal to or greater than a preset reference value and the operation time of the unmanned aerial vehicle has exceeded a preset reference time, the detection of the chemical pollution cloud is terminated in response to the preset detection purpose being achieved.

6. The method of claim 4, wherein, when the remaining amount of the battery of the unmanned aerial vehicle is equal to or greater than a preset reference value and the preset detection purpose is not achieved, the detection of the chemical pollution cloud is continued.

7. The method of claim 2, further comprising:
   when it is determined to terminate the pre-learned algorithm mode, moving to an initial take-off position of the unmanned aerial vehicle took off or a position preset by a user.

8. The method of claim 1, wherein the pre-learned algorithm receives a first concentration of a chemical gas at a first location of the unmanned aerial vehicle before the unmanned aerial vehicle moves and a second concentration of the chemical gas at a second location of the moved unmanned aerial vehicle, and is learned to determine a policy that maximizes a reward determined based on the difference between the first concentration and the second concentration.

9. The method of claim 8, wherein the pre-learned algorithm further receives topographic information on a topography in which the unmanned aerial vehicle moves to detect the chemical pollution cloud and simulated gas diffusion information in the topography, and learns the policy further using the topographic information and the simulated gas diffusion information, and wherein the simulated gas diffusion information is determined based on a movement ratio of the chemical pollution cloud over time in a plurality of grids obtained by dividing the topography.

10. An unmanned aerial vehicle for detecting chemical pollution cloud, comprising:
    a transceiver configured to receive a control signal from a control device for controlling the unmanned aerial vehicle; and
    a controller configured to control the transceiver, the controller further configured to:
        generate a status signal indicating a probability of communication between the unmanned aerial vehicle with the control device,
        determine a pre-learned algorithm mode for detecting the chemical pollution cloud based on the control signal and the status signal, and
        when the status signal indicates the probability of communication with the control device is lower than a pre-determined threshold, or when the control signal indicates to operate in the pre-learned algorithm mode, cause the unmanned aerial vehicle to detect the chemical pollution cloud based on a pre-learned algorithm stored in the unmanned aerial vehicle.

11. The unmanned aerial vehicle of claim 10, wherein the controller is further configured to determine whether to terminate the pre-learned algorithm mode based on an operation time of the unmanned aerial vehicle operating in the pre-learned algorithm mode and a remaining amount of a battery of the unmanned aerial vehicle.

12. The unmanned aerial vehicle of claim 11, wherein in response to the remaining amount of the battery of the unmanned aerial vehicle being less than a preset reference value, the controller is further configured to terminate the detection of the chemical pollution cloud.

13. The unmanned aerial vehicle of claim 11, wherein the controller is further configured to determine whether to terminate the pre-learned algorithm mode further based on whether or not a preset detection purpose is achieved.

14. The unmanned aerial vehicle of claim 13, wherein in response to the remaining amount of the battery of the unmanned aerial vehicle being equal to or greater than a preset reference value and the operation time of the unmanned aerial vehicle has exceeded a preset reference time, the controller is further configured to terminate the detection of the chemical pollution cloud based on the preset detection purpose being achieved.

15. The unmanned aerial vehicle of claim 13, wherein in response to the remaining amount of the battery of the unmanned aerial vehicle being equal to or greater than a preset reference value and the preset detection purpose being not achieved, the controller is further configured to continue the detection of the chemical pollution cloud.

16. The unmanned aerial vehicle of claim 10, wherein the pre-learned algorithm is configured to receive a first concentration of a chemical gas at a first location of the unmanned aerial vehicle before the unmanned aerial vehicle moves and a second concentration of the chemical gas at a second location of the moved unmanned aerial vehicle, and is configured to learned to determine a policy that maximizes a reward determined based on the difference between the first concentration and the second concentration.

17. The unmanned aerial vehicle of claim 16, wherein the pre-learned algorithm is further configured to receive topographic information on a topography in which the unmanned aerial vehicle moves to detect the chemical pollution cloud and simulated gas diffusion information in the topography, and learn the policy further using the topographic information and the simulated gas diffusion information, and
   wherein the simulated gas diffusion information is configured to be determined based on a movement ratio of the chemical pollution cloud over time in a plurality of grids obtained by dividing the topography.

18. A system for detecting chemical pollution cloud, comprising:
   a control device configured to transmit a control signal for controlling movement and detection of an unmanned aerial vehicle to the unmanned aerial vehicle; and
   the unmanned aerial vehicle configured to determine a pre-learned algorithm mode for detecting the chemical pollution cloud based on the control signal and a status signal indicating a probability of communication between the unmanned aerial vehicle with the control device,
   wherein when the status signal indicates the probability of communication with the control device is lower than a pre-determined threshold, or when the control signal indicates to operate in the pre-learned algorithm mode, the unmanned aerial vehicle is configured to detect the chemical pollution cloud based on a pre-learned algorithm stored in the unmanned aerial vehicle.

* * * * *